United States Patent
McLean

(10) Patent No.: US 6,973,305 B2
(45) Date of Patent: Dec. 6, 2005

(54) METHODS AND APPARATUS FOR DETERMINING DEVICE INTEGRITY

(75) Inventor: Ivan Hugh McLean, San Diego, CA (US)

(73) Assignee: Qualcomm INC, San Diego, CA (US)

( * ) Notice: Subject to any disclaimer, the term of this patent is extended or adjusted under 35 U.S.C. 154(b) by 135 days.

(21) Appl. No.: 10/659,847

(22) Filed: Sep. 10, 2003

(65) Prior Publication Data

US 2005/0059352 A1    Mar. 17, 2005

(51) Int. Cl.[7] .............................................. H04Q 7/20
(52) U.S. Cl. .................................. 455/425; 455/67.11
(58) Field of Search ............................... 455/423, 425, 455/67.11, 115.1, 419

(56) References Cited

U.S. PATENT DOCUMENTS 6,745,011 B1 *  6/2004  Hendrickson et al. ... 455/67.11

2004/0058651 A1 *  3/2004  Ross et al. ............... 455/67.11

* cited by examiner

Primary Examiner—Edward F. Urban
Assistant Examiner—Blane J. Jackson
(74) Attorney, Agent, or Firm—Philip R. Wadsworth; Robert J. O'Connell

(57) ABSTRACT

Methods and apparatus for determining the integrity of a device. A method is provided for use in a server to provide a dynamic integrity check of a client device. The method includes selecting a selected integrity application from one or more integrity applications, wherein the selected integrity application operates to generate a unique preselected integrity response. The method also includes downloading the selected integrity application for execution on the client device, and receiving a response from the selected integrity application. The method also includes determining whether or not the response is the preselected integrity response.

23 Claims, 3 Drawing Sheets

METHODS AND APPARATUS FOR DETERMINING DEVICE INTEGRITY

BACKGROUND

I. Field

The present invention relates generally to wireless data networks, and more particularly, to methods and apparatus for dynamically determining the integrity of a device.

II. Description of the Related Art

Advances in technology have resulted in the development and deployment of extensive data networks. These networks include both public data networks, such as the Internet, and specialized networks, such as wireless telecommunication networks. Users of these networks have the ability to access a wide variety of information and services that are available as network resources.

One example where there is an increasing demand for network resources is in wireless network environments. In wireless environments, a variety of wireless devices, such as wireless telephones, personal digital assistants (PDAs), and paging devices, communicate over a wireless network. The wireless network may also include network servers that operate to provide various network resources to the wireless devices. Furthermore, the wireless networks may also be coupled to a public network, such as the Internet, so that resources on the public network can be made available to the wireless devices on the wireless network.

Typically, a wireless device may download an application program or multimedia content from a network server using the wireless network. The application or content may be downloaded for free, or purchased by the user of the wireless device, who effectively obtains the rights to use the application or content for an unlimited, fixed, or usage count based expiration period.

Unfortunately, because of the ease and convenience of accessing network resources there currently exists a variety of device integrity problems. For example, during normal operation and usage, it is possible for a device to download malicious code in the form of viruses, worms, bugs, etc., that may compromise the operation of the device. It is also possible that the device has received unauthorized applications or content by downloading illegal versions, such as bootlegged versions that have their security or licensing features disabled. The device may also have applications or other software that is designed to circumvent network security features, thereby allowing the device to obtain network services in an unauthorized manner.

One solution used to address these problems involves using static client-based software that periodically "phones home" to report the status of the client device. However, such static client-based software approaches are flawed, since they rely on the integrity of the static client-based code. The client environment can be extremely hostile and the client-based code is likely to be reversed engineered and/or modified to hide or ignore any incriminating evidence or circumvent any meaningful functionality. Thus, periodic updates of the client software form a partial solution, but these inevitably suffer the same fate.

Therefore, what is needed is a system that operates to check the integrity of a device, where the integrity check is performed in a dynamic manner thereby preventing the integrity checking processes from being reversed engineered or otherwise circumvented.

SUMMARY

In one or more embodiments, an integrity system is provided that operates to perform a dynamic integrity check of a device. For example, in one embodiment, a mechanism is provided that performs dynamic integrity checking of a client device to detect signs of hostile activity, the presence of illegal applications or content, or the abuse of rights associated with digital content or applications. In one embodiment, the mechanism provided by the integrity system is dynamic and therefore extremely difficult to reverse engineer or circumvent, since any such attack must be effectively performed in real time.

In one embodiment, a method is provided for use in a server to provide a dynamic integrity check of a client device. The method comprises selecting a selected integrity application from one or more integrity applications, wherein the selected integrity application operates to generate a unique preselected integrity response. The method also comprises downloading the selected integrity application for execution on the client device, and receiving a response from the selected integrity application. The method also comprises determining whether or not the response is the preselected integrity response.

In another embodiment, apparatus is provided for providing a dynamic integrity check of a client device. The apparatus comprises selection logic that operates to select a selected integrity application from one or more integrity applications, wherein the selected integrity application operates to generate a unique preselected integrity response. The apparatus also comprises transmitting logic that operates to download the selected integrity application for execution on the client device. The apparatus also comprises receiving logic that operates to receive a response from the selected integrity application. The apparatus also comprises determining logic that operates to determine whether or not the response is the preselected integrity response.

In another embodiment, apparatus is provided that operates to provide a dynamic integrity check of a client device. The apparatus comprises means for selecting a selected integrity application from one or more integrity applications, wherein the selected integrity application operates to generate a unique preselected integrity response. The apparatus also comprises means for downloading the selected integrity application for execution on the client device. The apparatus also comprises means for receiving a response from the selected integrity application. The apparatus also comprises means for determining whether or not the response is the preselected integrity response.

In another embodiment, a computer-readable media is provided that comprises instructions, that when executed by a processor in an integrity system, operate to dynamically check the integrity of a device. The computer-readable media comprises instructions for selecting a selected integrity application from one or more integrity applications, wherein the selected integrity application operates to generate a unique preselected integrity response. The computer-readable media also comprises instructions for downloading the selected integrity application for execution on the client device. The computer-readable media also comprises instructions for receiving a response from the selected integrity application. The computer-readable media also comprises instructions for determining whether or not the response is the preselected integrity response.

Other aspects, advantages, and features of the present invention will become apparent after review of the herein-after set forth Brief Description of the Drawings, Detailed Description of the Invention, and the claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes an integrity system that performs dynamic integrity checking of a client device. In one embodiment, a number of unique and extremely small integrity applications are created for a given time period. Each application performs a slightly different set of integrity checking operations when executing on a client device. The results of those integrity checking operations are reported back to a central server. In one embodiment, when the client connects to the server to download applications or request other server services, the server selects and downloads one or more integrity applications. The criteria for the frequency at which this occurs and the selection of the applications to be downloaded may include, but is not limited to; the type of client hardware, geographic location, carrier identifier (ID), or a statistical analysis of client behavior. Each integrity application checks one or more aspects of the client device and creates a unique response message, which in one embodiment, is encrypted, authenticated, and transmitted to the central server. The application then removes itself from the client. If the response message contains incriminating evidence, if authentication fails, or if authentication is not received or received after a cutoff period, then the server may take appropriate action. For example, the client's activity with the server may be restricted.

In one or more embodiments, the integrity applications interact with a runtime environment executing on the client that is used to simplify operation of the client, such as by providing generalized calls for device specific resources. One such runtime environment is the Binary Runtime Environment for Wireless™ (BREW™) software platform developed by QUALCOMM, Inc., of San Diego, Calif. In the following description, it will be assumed that the client is a wireless device that is executing a runtime environment, such as the BREW software platform. However, in one or more embodiments, the integrity applications are suitable for use with other types of runtime environments to provide dynamic integrity checking of a variety of wired or wireless devices. For example, the wireless devices may be any type of wireless device, including but not limited to, a wireless telephone, pager, PDA, email device, tablet computer, or other type of wireless device.

Figure 1:
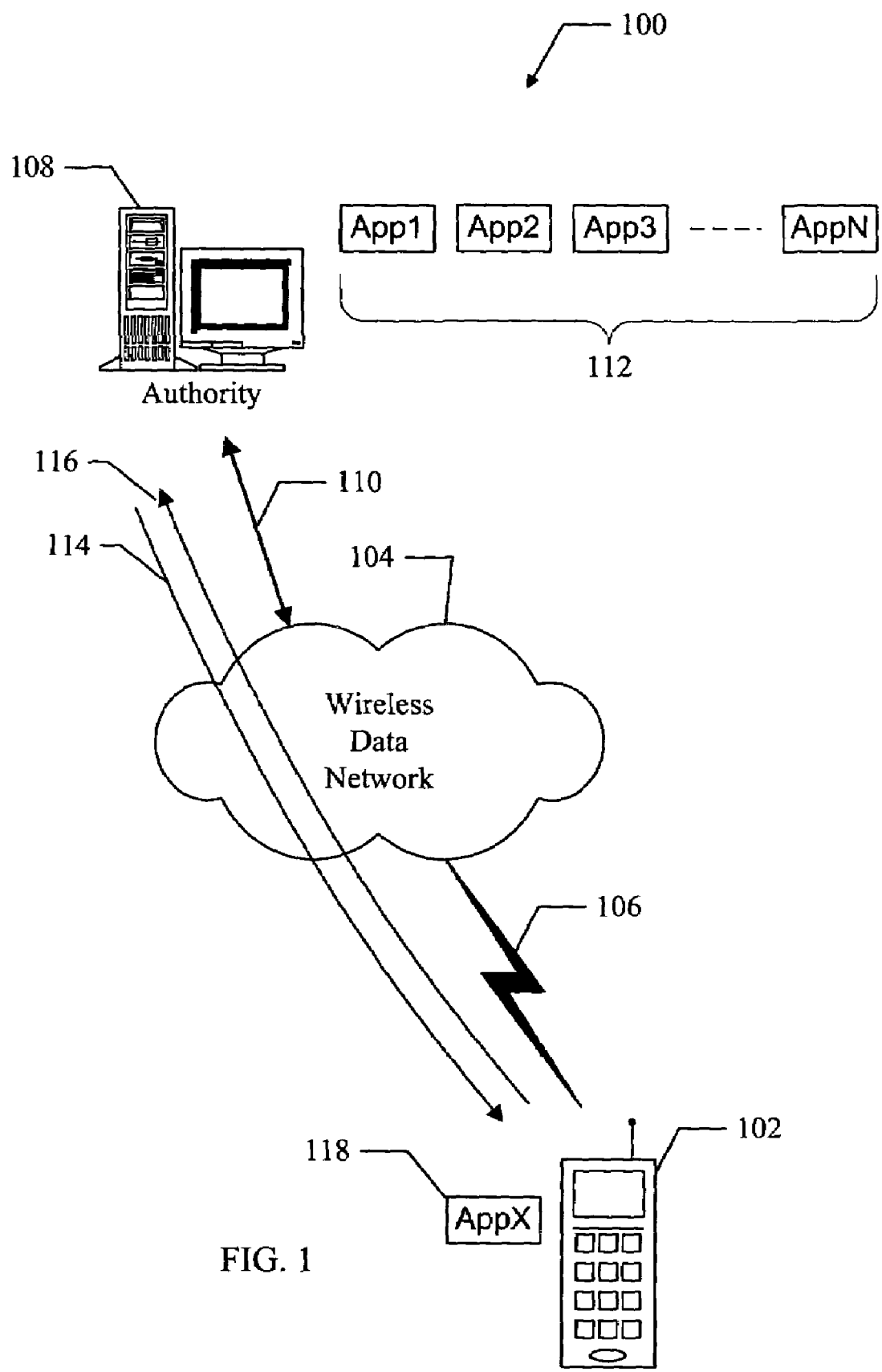
FIG. 1 shows a data network that comprises one embodiment of an integrity system for checking the integrity of a device.

FIG. 1 shows a data network 100 that comprises one embodiment of an integrity system for checking the integrity of a device. The network 100 comprises a wireless device 102 that communicates with a wireless data network 104 via a wireless communication channel 106. The network 100 also comprises an authority 108 that operates to provide services to the wireless device 102 and other entities in communication with the network 104. For example, the authority may be a network server associated with a telecommunications network. The authority 108 communicates with the wireless network by using link 110, which may be a wired or wireless link. For example, the wireless device 102 may be a wireless telephone, and the authority 108 may be part of a nationwide telecommunications network that provides telecommunication services to the device 102.

During operation, the integrity system operates to dynamically check the integrity of the device 102. For example, in one embodiment, the authority 108 operates to select one or more of the integrity applications 112 for download to the device 102, as shown by path 114. The integrity applications 112 have known unique predefined responses that may be setup, changed, updated or otherwise determined at random or periodic intervals.

Once an integrity application is downloaded to the device 102, it runs on the device to determine the integrity of the device with respect to one or more aspects. For example, the integrity application 118 is downloaded to the device using path 114. In one embodiment, the integrity application 118 runs under a runtime environment that is executing on the device 102, for instance, the BREW runtime environment. In one embodiment, the integrity application 118 searches the device 102 for known viruses, worms, or other malicious code. In another embodiment, the integrity application 118 may search the device 102 for proprietary content, and when such content is found, the integrity application 118 then checks to determine if the proper licenses for the content exist. The integrity application 118 may check virtually any aspect of the device 102 to determine the integrity of the device 102.

Once the integrity application 118 has determined the integrity of the device 102, the application 118 operates to generate a response that is transmitted back to the authority 108, as shown at path 116. For example, if the integrity application 118 determines that the integrity of the device is acceptable, a predefined integrity response is generated by the integrity application 118 and transmitted to the authority 108. The response may also include any other integrity information discovered about the device. For example, the response may include information about applications, content, or other information found on the device. Furthermore, in one embodiment, the response is generated and transmitted in real-time. If the integrity of the device is not acceptable, the integrity application 118 generates a negative response message that is transmitted back to the authority 108.

In one embodiment, an integrity response will not be generated if the device 102 includes software, hardware, a combination or software and hardware, or some other agent that blocks the operation of the integrity application 118. In this case, the authority 108 is free to assume that the integrity of the device is not acceptable because a response was not received. For example, if the integrity system does not receive a response in a predetermined time interval, then it is assumed that no response has been transmitted.

In one situation, it may be possible that the device 102 contains an agent that attempts to falsify the predefined response message. However, because the integrity system is dynamic, and the response is expected in real-time, it is extremely difficult for the agent to falsify the response. In one embodiment, the authority 108 operates to randomly select integrity applications for download to the device 102.

This prevents an agent on the device 102 from anticipating what integrity check will be performed. In another embodiment, the authority 108 operates to change the predefined integrity response of the selected integrity application. For example, the authority may include a real time indicator or a digital signature in the predefined response message. Thus, even if an agent on the device is aware of a prior predefined integrity response, transmitting that prior response to the authority will result in a failed integrity check.

The selection of the integrity application and/or the type of integrity response can be dynamically adjusted to change randomly or periodically so that any agent operating on the device will be unable to know the predefined integrity response in advance. Furthermore, it would be extremely difficult to reverse engineer the integrity application to determine what the predefined integrity response is because such reverse engineering would have to be done in real-time. As a result, the operation of the integrity system is extremely difficult to circumvent.

Figure 2:
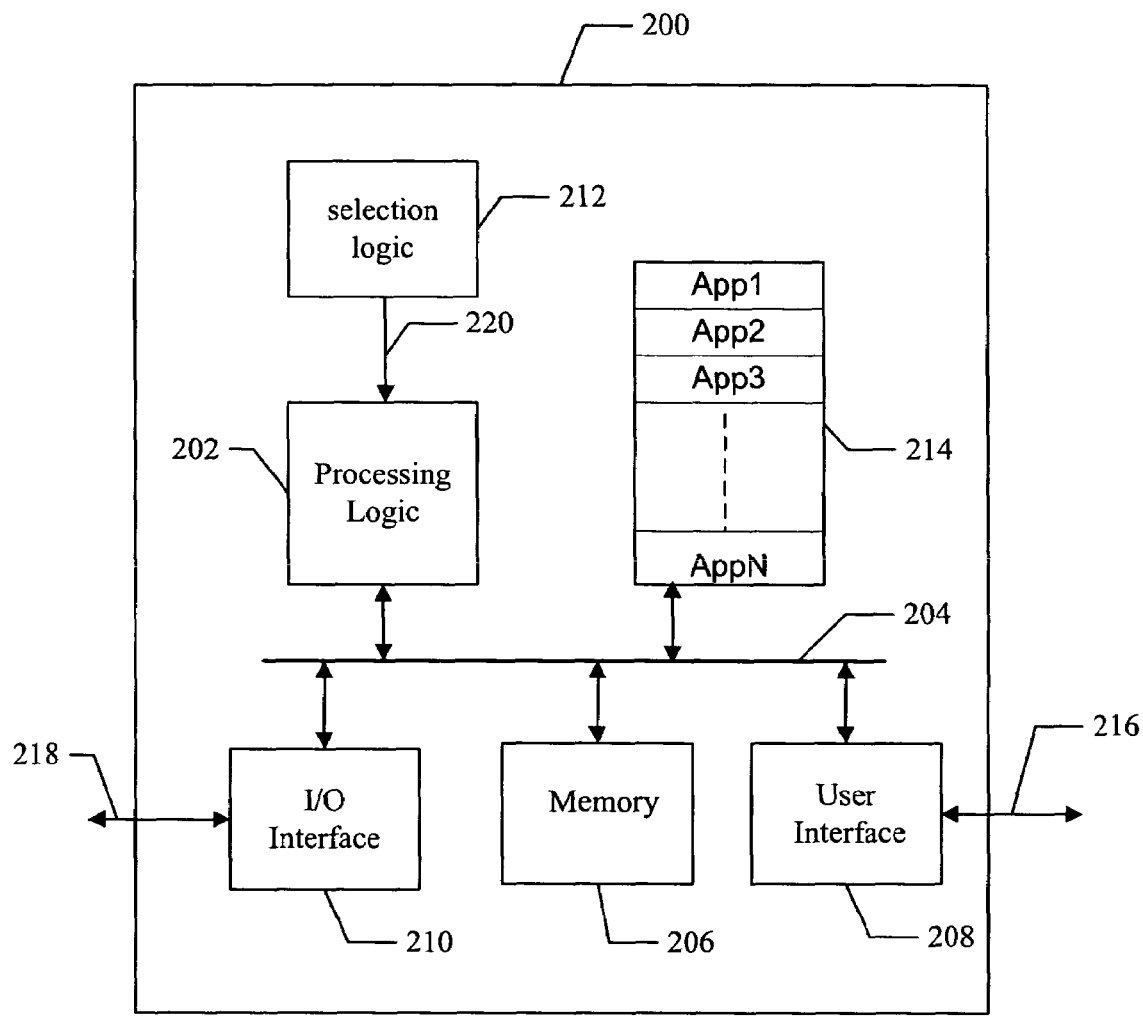
FIG. 2 shows a functional block diagram illustrating one embodiment of an integrity system that operates to perform dynamic integrity checking of a device.

FIG. 2 shows a functional block diagram illustrating one embodiment of an integrity system 200 that operates to perform dynamic integrity checking of a device. For example, the integrity system 200 is suitable for use with, or as part of, the authority 108 to check the integrity of the wireless device 102.

The integrity system 200 comprises processing logic 202 that is coupled to an internal data bus 204. Also coupled to the internal data bus 204 are memory 206, user interface 208, and I/O interface 210. The integrity system 200 also comprises selection logic 212 coupled to the processing logic 202, and application memory 214 coupled to the internal data bus 204. The application memory 214 comprises a set of integrity applications (App1, App2, . . . AppN).

In one or more embodiments, the processing logic 202 comprises a CPU, gate array, hardware logic, software, or any combination of hardware and software. Thus, the processing logic 202 generally comprises logic to execute machine-readable instructions.

The memory 206 comprises RAM, ROM, FLASH, EEROM, or any other suitable type of memory, or a combination thereof. In one embodiment, the memory 206 is located internal to the integrity system 200, and in another embodiment, the memory 206 comprises a removable memory card or memory device that may be selectively attached to the integrity system 200, and thereby couple to the internal bus 204. Thus, the memory 206 may comprise virtually any type of memory that is capable of storing instructions that may be executed by the processing logic 202.

The user interface 208 receives user input 216, for example, from a keypad, pointing device, touch pad, or other input mechanisms to allow a user to interact with the device 102. The user interface 208 may also couple to a display device, such as a CRT, LCD, LED, or any other type of display device to provide a visual display to the user. Any other type of input or output device may also be coupled to the user interface 208, such as, disk storage, audio logic, video devices, etc.

The I/O interface 210 operates to transmit and receive information between the integrity system 200 and external devices, systems, and/or networks using the communication link 218. For example, the I/O interface 210 provides communication between the integrity system 200 and the authority 108. In another embodiment, the I/O interface 210 provides communication between the integrity system 200 and the wireless network 104, thereby allowing the integrity system 200 to communicate directly with the device 102.

In one embodiment, the I/O interface 210 comprises a radio transceiver circuit (not shown) that operates to transmit and receive information over a wireless data network using the communication link 218. For example, the communication link 218 may be the communication link 110 shown in FIG. 1. For example, the transceiver comprises circuitry that modulates information received from the processing logic 202 and converts the modulated information into high frequency signals suitable for wireless transmission. Similarly, the transceiver also comprises circuitry to convert received high frequency communication signals into signals suitable for demodulation and subsequent processing by the processing logic 202.

In another embodiment, the I/O interface 210 comprises a transceiver that operates to transmit and receive information over a hardwired communication link, such as a telephone line, or other type of data line, to communicate with a remote system on a public data network, such as the Internet.

In still another embodiment, the I/O interface 210 comprises circuitry that operates to communicate with local devices, such as a local workstation. The I/O interface 210 may also include circuitry (such as serial or parallel port logic) to communicate with a printer or other local computer or device, such as floppy disk or memory card. Thus, the I/O interface 210 may comprise any type of hardware, software, or combination thereof to allow the integrity system 200 to communicate with other local or remotely located devices or systems.

In one embodiment, the selection logic 212 comprises a CPU, processor, logic, software, or any combination of hardware and software. The selection logic 212 is coupled to the processing logic via selection link 220 and operates to provide selection information to the processing logic 202. The selection information identifies one or more integrity applications (App1–AppN) to be transmitted to the device 102. For example, the selection logic 212 is used by the processing logic 202 to determine which integrity applications to retrieve from the application memory 214, which are then transmitted to the device 102. Virtually any type of selection process or procedure can be used by the selection logic 212 to select the integrity applications for transmission to the device. For example, the selection logic may use time, location, random, or periodic indicators to select the selected integrity applications for transmission to the device 102.

After selection of the integrity application to be transmitted to the device, the processing logic 202 operates to include a reference indicator in the application that is used in a predefined response message generated by the application. For example, the reference indicator may be a time or date reference, a digital signature, or any other type of reference indicator. When the application attempts to transmit a response message back to the integrity system, the reference indicator is used in the response. Thus, the integrity system is able to use the reference indicator to distinguish between real and false responses. For example, a fake or false response will not have the correct reference indicator.

It should be noted that the configuration of the integrity system 200 is just one suitable configuration. It is also possible to implement the integrity system 200 using other configurations, functional elements or element configurations within the scope of the present invention.

During operation of the integrity system 200, the processing logic 202 executes program instructions stored in the memory 206 to perform the functions described herein. For example, in one embodiment, the integrity system 200 performs the described functions when the processing logic 202 executes program instructions stored in the memory 206. In another embodiment, the program instructions are stored on a computer-readable media, such as a floppy disk, CD, memory card, FLASH memory device, ROM, or any other type of memory device. The program instructions are loaded into the memory 206 via the I/O interface 210. For example, the integrity system 200 may download the program instructions from the computer-readable media into the memory 206 via the I/O interface 210.

Figure 3:
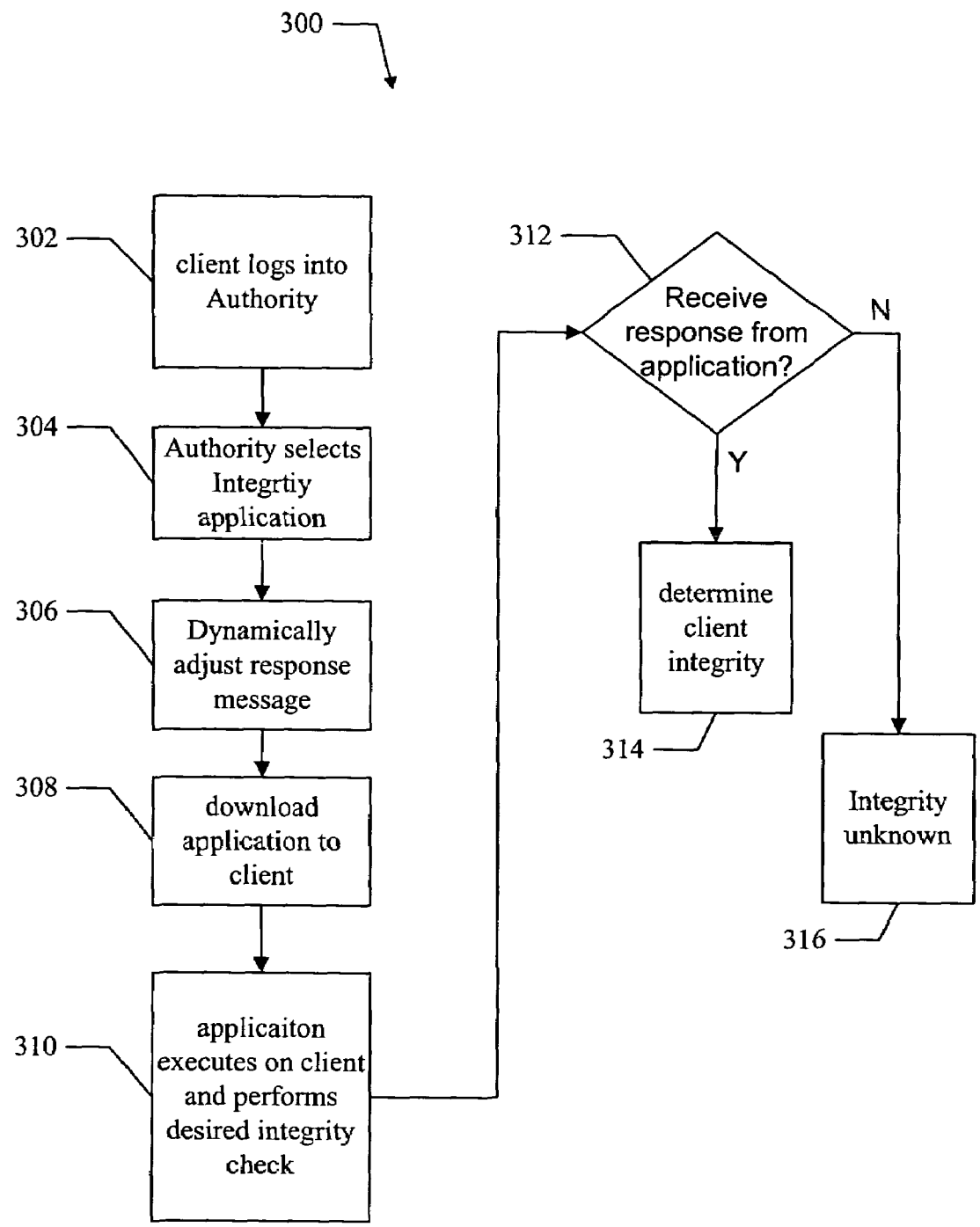
FIG. 3 shows one embodiment of a method for operating an integrity system to check the integrity of a device.

FIG. 3 shows one embodiment of a method 300 for operating one embodiment of an integrity system, for example, the integrity system 200. For example, the method 300 will be described with reference to the integrity system 200 shown in FIG. 2. It will be assumed that the integrity system 200 is coupled to a data network so that the system 200 may communication with a device, for example, the wireless device 102.

At block 302, the client device logs into the authority to obtain services from the authority. For example, the device logs into the authority to download an application, multimedia content, or receive some other service.

At block 304, the integrity system operating on the authority selects an integrity application to download to the device. For example, the processing logic 202 receives selection information from the selection logic 212, and that information is used to retrieve one or more integrity applications from the memory 214. Each integrity application operates to determine an aspect of client integrity. For example, one integrity application may determine whether or not a virus exists on the client, and another application may determine whether or not licensed multimedia content exists on the client. Each integrity application has a predefined response message that is known to the authority.

At block 306, the integrity system dynamically adjusts the desired response message of the integrity application. For example, in one embodiment, the integrity system sets the response message to include a real-time reference, for instance, the current time, a digital signature, or some other reference indicator. Thus, when the integrity application transmits the response message back to the authority, the integrity system can verify the real-time reference. Virtually any real-time reference or other verification reference can be dynamically included in the response message.

At block 308, the integrity system downloads the selected integrity application to the device. For example, the processing logic 202 transmits the application to the device using the I/O interface 210. The application includes the dynamic reference indicator.

At block 310, the selected integrity application runs on the device and acquires integrity information. For example, the selected integrity application runs under a runtime environment executing on the device. For example, the runtime environment may be the BREW environment. During operation, the integrity application obtains information relative to one or more aspects of client integrity. For example, the application may determine if the device has a virus, or may determine if the device has un-licensed content. Virtually any aspect of client integrity may be determined by the integrity application. If the application runs successfully, the integrity application transmits an integrity response message back to the integrity system at the authority.

At block 312, a test is performed to determine if the integrity application has transmitted a response message back to the integrity system. For example, after determining the integrity of the client device, the integrity application generates a response message that is transmitted back to the integrity system. The response message includes the real-time reference as initially provided by the integrity system. If a response is received from the integrity application, the method proceeds to block 314. If no response is received, the method proceeds to block 316.

At block 314, the integrity system receives the response message transmitted form the integrity application executing on the client device. The integrity system operates to process the response message to determine the integrity of the client device. For example, the response message includes the reference indicator, which indicates that the response came from the downloaded application. Virtually any other information may be included in the response message to inform the integrity system about the integrity of the client device.

At block 316, if no response was received from the integrity application, the integrity system may assume that the device has blocked the operation of the integrity program, and as a result, the authority may operate to take appropriate action. For example, the device may be restricted from receiving further services from the authority.

An integrity system has been described that includes methods and apparatus to dynamically check the integrity of a client device. The system is suitable to provide dynamic integrity checking for all types of wired and wireless devices, and is especially well suited for use with mobile telephones.

Accordingly, while one or more embodiments of methods and apparatus for an integrity system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

I claim:

1. A method for use in a server to provide a dynamic integrity check of a client device, the method comprising:
   selecting a selected integrity application from one or more integrity applications, wherein the selected integrity application comprises a predefined integrity response;
   downloading the selected integrity application for execution on the client device;
   receiving a response based on integrity checking of the predefined selected integrity application on the client device; and
   determining a match of at least whether or not the response comprises the preselected integrity response.

2. The method of claim 1, further comprising dynamically adjusting the predefined integrity response to include a reference value.

3. The method of claim 2, wherein the reference value comprises at least one of a time-based reference value, a date-based reference value, and a digital signature.

4. The method of claim 1, wherein the response comprises the absence of any response within a selectable time period.

5. The method of claim 1, wherein the step of selecting comprises randomly selecting the selected integrity application from the one or more integrity applications.

6. The method of claim 1, wherein the step of selecting comprises selecting the selected integrity application from the one or more integrity applications based on at least one of a device location, a type of hardware, a carrier identification, a behavior associated with the client device, a time, a random indicator, a periodic indicator.

7. The method of claim 1, wherein the client device is a wireless device.

8. The method of claim 1, further comprising dynamically changing at least one of the selection of the selected integrity application and the predefined integrity response prior to downloading the selected integrity application for execution on the client device.

9. Apparatus for providing a dynamic integrity check of a device, the apparatus comprising:
   selection logic that operates to select a selected integrity application from one or more integrity applications, wherein the selected integrity application comprises a predefined integrity response;
   transmitting logic that operates to download the selected integrity application for execution on the device;
   receiving logic that operates to receive a response based on integrity checking of the predefined selected integrity application on the client device; and
   determining a match of at least a portion logic that operates to determine whether or not the response comprises the preselected integrity response.

10. The apparatus of claim 9, further comprising logic to dynamically adjust the predefined integrity response to include a reference value.

11. The apparatus of claim 10, wherein the reference value comprise at least one of a time-based reference value, a date-based reference value, and a digital signature.

12. The apparatus of claim 9, wherein the device is a wireless device.

13. The apparatus of claim 9, further comprising logic for dynamically changing at least one of the selection of the selected integrity application and the predefined integrity response prior to downloading the selected integrity application for execution on the client device.

14. Apparatus that operates to provide a dynamic integrity check of a device, the apparatus comprising:
   means for selecting a selected integrity application from one or more integrity applications, wherein the selected integrity application comprises a predefined integrity response;
   means for downloading the selected integrity application for execution on the device;
   means for receiving a response based on integrity checking of the predefined selected integrity application on the client device; and
   means for determining a match of at least whether or not the response comprises the preselected integrity response.

15. The apparatus of claim 14, further comprising means for dynamically adjusting the predefined integrity response to include a reference value.

16. The apparatus of claim 15, wherein the reference value comprises at least one of a time-based reference value, a date-based reference value, and a digital signature a time-based value.

17. The apparatus of claim 14, wherein the device is a wireless device.

18. The apparatus of claim 14, further comprising means for dynamically changing at least one of the selection of the selected integrity application and the predefined integrity response prior to downloading the selected integrity application for execution on the client device.

19. A computer-readable media comprising instructions that when executed by a processor in an integrity system operate to dynamically check the integrity of a device, the computer-readable media comprising:
   instructions for selecting a selected integrity application from one or more integrity applications, wherein the selected integrity application comprises a predefined integrity response;
   instructions for downloading the selected integrity application for execution on the device;
   instructions for receiving a response based on integrity checking of the predefined selected integrity application one the client device; and
   instructions for determining a match of at least a portion whether or not the response comprises the preseleted integrity response.

20. The computer-readable media of claim 19, further comprising instructions for dynamically adjusting the predefined integrity response to include a reference value.

21. The computer readable media of claim 20, wherein the reference value comprises at least one of a time-based reference value, a date-based reference value, and a digital signature a time-based value.

22. The computer-readable media of claim 19, wherein the device is a wireless device.

23. The computer-readable media of claim 19, further comprising instructions for dynamically changing at least one of the selection of the selected integrity application and the predefined integrity response prior to downloading the selected integrity application for execution on the client device.

* * * * *